United States Patent [19]

Wegehaupt et al.

[11] Patent Number: 4,975,510

[45] Date of Patent: Dec. 4, 1990

[54] PROCESS FOR PREPARING DIORGANOPOLYSILOXANES HAVING TERMINAL TRIORGANOSILOXY UNITS

[75] Inventors: Karl-Heinrich Wegehaupt; Karl Braunsperger; Jörg Patzke, all of Burghausen, Fed. Rep. of Germany

[73] Assignee: Wacker-Chemie GmbH, Munich, Fed. Rep. of Germany

[21] Appl. No.: 270,131

[22] Filed: Nov. 14, 1988

[30] Foreign Application Priority Data

Dec. 11, 1987 [DE] Fed. Rep. of Germany ....... 3742069

[51] Int. Cl.$^5$ ............................................. C08G 77/06
[52] U.S. Cl. ........................................ 528/21; 528/23; 528/33; 528/37; 556/467
[58] Field of Search .................. 528/23, 33, 37, 21; 556/467

[56] References Cited

U.S. PATENT DOCUMENTS

| | | | |
|---|---|---|---|
| 3,078,255 | 2/1963 | Pike | 528/23 |
| 3,549,680 | 12/1970 | Wegehaupt et al. | 528/37 |
| 3,779,987 | 12/1973 | Razzano | 528/37 |
| 3,839,388 | 10/1974 | Nitzsche et al. | 528/23 |
| 4,722,987 | 2/1988 | Ikeno et al. | 528/23 |
| 4,725,643 | 2/1988 | Burkhardt | 524/789 |
| 4,792,596 | 12/1988 | Ottlinger et al. | 528/14 |
| 4,835,237 | 5/1989 | Burkhardt et al. | 528/21 |

*Primary Examiner*—Lewis T. Jacobs
*Assistant Examiner*—Ralph J. Dean, Jr.

[57] ABSTRACT

A process for preparing diorganopolysiloxanes containing terminal triorganosiloxy groups which comprises reacting in a 1st step, a cyclic diorganopolysiloxane and/or diorganodichlorosilane hydrolyzate with from 0.05 to 3 percent by weight of triorganochlorosilane, based on the weight of the cyclic diorganopolysiloxane and/or diorganodichlorosilane hydrolyzate employed in the presence of from 1 to 50 ppm by weight of phosphonitrile chloride, based on the total weight of the organosilicon compounds employed, to form a reaction mixture containing $\alpha$-triorganosiloxy-$\omega$-chlorodiorganopolysiloxane, and in a 2nd step, adding to the reaction mixture obtained in the 1st step and containing the $\alpha$-triorganosiloxy-$\omega$-chlorodiorganopolysiloxane, a diorganopolysiloxane having one Si-bonded hydroxyl group in each of the terminal units in an amount of from 1 to 1.2 gram-moles of Si-bonded hydroxyl group in this diorganopolysiloxane per gram-atom of Si-bonded chlorine in the triorganochlorosilane, and in a 3rd step, adding hexaorganodisilazane to the reaction mixture of the 2nd step in order to deactivate the phosphonitrile chloride and remove hydrogen chloride from the diorganopolysiloxanes containing terminal triorganosiloxy groups and thereafter removing the low-boiling components by distillation.

5 Claims, No Drawings

PROCESS FOR PREPARING DIORGANOPOLYSILOXANES HAVING TERMINAL TRIORGANOSILOXY UNITS

The present invention relates to a process for preparing organopolysiloxanes and more particularly to a process for preparing triorganosiloxy terminated diorganopolysiloxanes.

BACKGROUND OF THE INVENTION

It is known from British Patent No 1,195,761 to Wacker-Chemie, that organohalosilicon compounds can be prepared by reacting halosilicon compounds with organosiloxanes which do not contain an Si-bonded halogen in the presence of phosphonitrile chloride. In Example 9 of the British patent, α-trimethylsiloxy-ω-chlorodimethylpolysiloxane is prepared by reacting trimethylchlorosilane and octamethylcyclotetrasiloxane in the presence of phosphonitrile chloride. According to the teachings of the British patent, substantially greater amounts of halosilicon compounds and phosphonitrile chloride were employed than is employed in the present invention. Moreover, the British patent does not describe the preparation of diorganopolysiloxanes having terminal triorganosiloxy units. Furthermore, the British patent does not describe a process for controlling the viscosity and molecular weight distribution of the diorganopolysiloxanes.

Therefore, it is an object of the present invention to provide a process for preparing diorganopolysiloxanes having terminal triorganosiloxy units in which the viscosity of the diorganopolysiloxanes can be controlled. Another object of the present invention is to provide a process for preparing diorganopolysiloxanes having terminal triorganosiloxy groups from readily available organosilicon compounds, at relatively low cost and in good yields. A further object of the present invention is to provide a process for preparing diorganopolysiloxanes containing terminal triorganosiloxy units which have a narrow molecular weight distribution.

SUMMARY OF THE INVENTION

The foregoing objects and others which will become apparent from the following description are accomplished in accordance with this invention, generally speaking, by providing a process for preparing diorganopolysiloxanes having terminal triorganosiloxy units which comprises in a 1st step, reacting an organosilicon compound selected from the group consisting of a cyclic diorganopolysiloxane, diorganodichlorosilane hydrolyzate and mixtures thereof with from 0.05 to 3 percent by weight of a triorganochlorosilane, based on the weight of the organosilicon compound employed in the presence of from 1 to 50 ppm by weight of phosphonitrile chloride, based on the total weight of the organosilicon compound and the triorganochlorosilane to form a mixture containing α-triorganosiloxy-ω-chlorodiorganopolysiloxane, and in a 2nd step, adding to the reaction mixture obtained from the 1st step and containing the α-triorganosiloxy-ω-chlorodiorganopolysiloxane, a diorganopolysiloxane containing one Si-bonded hydroxyl group in each of the terminal units in an amount of from 1 to 1.2 gram-moles of Si-bonded hydroxyl group in this diorganopolysiloxane per gram-atom of Si-bonded chlorine in the triorganochlorosilane, and in a 3rd step, adding hexaorganodisilazane to the reaction mixture of the 2nd step in order to deactivate the phosphonitrile chloride and to remove hydrogen chloride from the triorganosiloxy terminated diorganopolysiloxanes and thereafter distilling off the low-boiling components.

DESCRIPTION OF THE INVENTION

In the 1st step of the process of this invention, the cyclic diorganopolysiloxane employed is preferably one having the formula $$(R_2SiO)_n$$

where R represents the same or different hydrocarbon radicals having from 1 to 18 carbon atom(s) per radical or halogenated hydrocarbon radicals having from 1 to 18 carbon atom(s) per radical, and n is an integer having a value of from 3 to 11.

Although, it is possible to employ only one type of cyclic diorganopolysiloxane; a mixture of at least two different types of cyclic diorganopolysiloxanes, in which the difference may be different ring size and/or different substituents on the silicon atoms may also be employed.

In the 1st step of the process of this invention, the diorganoiichlorosilane hydrolyzate employed is preferably one which comprises from 20 to 30 percent by weight of a cyclic diorganopolysiloxane of the formula $$(R_2SiO)_{n'}$$

and from 70 to 80 percent by weight of a diorganopolysiloxane of the formula $$HO(R_2SiO)_mSiR_2OH,$$

based on the weight of the diorganodichlorosilane hydrolyzate employed, R and n are the same as above and m is an integer having a value of from 20 to 50.

Examples of hydrocarbon radicals represented by R are alkyl radicals, such as methyl and ethyl radicals and butyl, decyl, and octadecyl radicals; hydrocarbon radicals having at least one aliphatic multiple bond, such as the vinyl radical; aryl radicals, such as the phenyl radical; alkaryl radicals, such as the tolyl radicals; and aralkyl radicals such as the benzyl radical. Examples of halogenated hydrocarbon radicals represented by R are haloalkyl radicals, such as the 3,3,3-trifluoropropyl radical, and haloaryl radicals, such as the o-, p- and m-chlorophenyl radicals.

However, it is preferred that cyclic diorganopolysiloxanes and/or diorganodichlorosilane hydrolyzates in which all the organic radicals are methyl groups be used in the process of this invention.

In the 1st step of the process of this invention, the triorganochlorosilane employed is preferably one of the formula $$R_3SiCl$$

where R is the same as above.

A particularly preferred triorganochlorosilane is vinyldimethylchlorosilane. Another triorganochlorosilane which can be employed in the process of this invention is trimethylchlorosilane.

The viscosity of the final product, that is, the triorganosiloxy terminated organopolysiloxane, can be controlled specifically by means of the amount of triorganochlorosilane employed in the reaction with the cyclic diorganopolysiloxane and/or diorganodichlorosilane hydrolyzate in the 1st step of the process of this invention. Thus, the amount of triorganochlorosilane is preferably in the range of from 0.05 to 3 percent by weight, and more preferably in the range of from 0.3 to 2 percent by weight, based on the weight of the organosilicon compound, i.e., the cyclic diorganopolysiloxane and/or diorganodichlorosilane hydrolyzate.

The phosphonitrile chlorides which are employed in the 1st step of the process of this invention and which are still present in the reaction mixture in the 2nd step of the process of this invention may be, for example, those which have been prepared by reacting 400 parts by weight of phosphorus pentachloride with 130 parts by weight of ammonium chloride (cf., for example, "Bericht der Deutschen Chemischen Gesellschaft", Volume 57, 1924, page 1345), or those which can be obtained by reacting 2 moles of phosphorus pentachloride with 1 mole of ammonium chloride (cf., for example, U.S. Pat. No. 3,839,388 to Nitzsche et al). Of course, it is also possible to employ mixtures of at least two different types of phosphonitrile chlorides.

Phosphonitrile chloride is used in an amount of from 1 to 50 ppm by weight, and more preferably in an amount of from 20 to 40 ppm by weight, based on the weight of the organosilicon compound and the triorganochlorosilane employed.

The reaction of a cyclic diorganopolysiloxane and/or a diorganodichlorosilane hydrolyzate with a triorganochlorosilane in the presence of phosphonitrile chloride in the 1st step of the process of this invention is carried out at a temperature of preferably from 60° to 100° C., and more preferably from 70° to 90° C., and preferably at a pressure of the ambient atmosphere, i.e., at 1,020 hPa (abs.) or about 1,020 hPa (abs.). If desired, however, higher or lower pressures can be used during the reaction. The preferred reaction times are in the range of from 3 to 8 hours.

The α-triorganosiloxy-ω-chlorodiorganopolysiloxane obtained in the 1st step of the process from the reaction of the cyclic diorganopolysiloxane and/or the diorganodichlorosilane hydrolyzate with a triorganochlorosilane in the presence of phosphonitrile chloride is converted in the 2nd step of the process into a diorganopolysiloxane containing terminal triorganosiloxy groups by adding to the reaction mixture of the 1st step a diorganopolysiloxane containing one Si-bonded hydroxyl group in each of the terminal units.

In the 2nd step of the process of this invention, the diorganopolysiloxane containing one Si-bonded hydroxyl group in each of the terminal units is represented by the formula HO(R$_2$SiO)$_p$SiR$_2$OH where R is the same as above, and p is an integer having a value of from 8 to 13.

In the process of this invention, the preferred diorganopolysiloxane containing one Si-bonded hydroxyl group in each of the terminal units is one in which all the organic radicals are methyl groups.

The diorganopolysiloxane containing one Si-bonded hydroxyl group in each of the terminal units is employed in an amount of from 1 to 1.2 gram-moles of Si-bonded hydroxyl group in the diorganopolysiloxane per gram-atom of Si-bonded chlorine in the triorganochlorosilane.

The reaction of a diorganopolysiloxane containing one Si-bonded hydroxyl group in each of the terminal units with an α-triorganosiloxy-ω-chlorodiorganopolysiloxane to form a diorganopolysiloxane containing terminal triorganosiloxy groups in the 2nd step of the process of this invention is preferably carried out at a temperature of from 75° to 100° C., and more preferably from 85° to 95° C. In order to simplify removal of the hydrogen chloride formed during the condensation reaction. It is preferred that the reaction be carried out at a pressure less than 30 hPa (abs.). However, this reaction can also be carried out at higher pressures. The preferred reaction times are in the range of from 2 to 3 hours.

In order to stabilize the diorganopolysiloxanes containing terminal triorganosiloxy groups which are obtained in the 2nd step of the process of this invention against viscosity changes, the phosphonitrile chloride is deactivated in the 3rd step of the process by adding hexaorganodisilazane to the reaction mixture obtained from the 2nd step, and the remaining hydrogen chloride is simultaneously removed.

In the 3rd step of the process of this invention, the hexaorganodisilazane employed preferably has the formula (R$_3$Si)$_2$NH where R is the same as above.

The preferred hexaorganodisilazane is one in which the organic groups correspond to the terminal triorganosiloxy groups of the diorganopolysiloxane to be prepared, such as, for example, 1,3-divinyl-1,1,3,3-tetramethyldisilazane in the preparation of a vinyldimethylsiloxy-terminated diorganopolysiloxane. An important hexaorganodisilazane which can be employed in the process of this invention is also hexamethyldisilazane.

The hexaorganodisilazane is preferably employed in an amount of from 0.3 to 0.5 percent by weight, based on the weight of the organosilicon compound, i.e., the cyclic diorganopolysiloxane and/or diorganodichlorosilane hydrolyzate employed.

The low-boiling components, which are, in particular, cyclic diorganopolysiloxanes and excess hexaorganodisilazane and also cleavage products thereof, are removed from the diorganopolysiloxanes containing terminal triorganosiloxy groups by distillation. The distillation is preferably carried out at a temperature of from 140° to 150° C. and at 0.5 to 8 hPa (abs.).

The diorganopolysiloxanes containing triorganosiloxy terminal units which are prepared by the process of this invention preferably have a viscosity of from 250 to 1,000,000 mPa.s at 25° C., and more preferably from 500 to 40,000 mPa.s at 25° C.

The diorganopolysiloxanes containing triorganosiloxy terminal groups which are prepared by this invention can be employed for all purposes for which it was possible to employ diorganopolysiloxanes containing terminal triorganosiloxy groups which were prepared by the processes known heretofore. They may be employed, for example, as filament lubricants, in the production of organopolysiloxane elastomers which have been crosslinked by free-radical generators or by the addition reaction of SiC-bonded vinyl groups and Si-bonded hydrogen, and in the production of adhesive-repellent coatings.

The phosphonitrile chloride used in the following examples was prepared as follows:

A mixture containing 417 g (2 mol) of phosphorus pentachloride and 53.5 g (1 mol) of ammonium chloride in 1,000 ml of tetrachloroethane is warmed under reflux for 12 hours. The volatile components of the pale yellow solution thus obtained are removed at 160° C. with reduction of the pressure to about 1.33 hPa (abs.). Yellowish crystals consisting essentially of the compound of the formula Cl$_3$PNPCl$_2$NPCl$_3$.PCl$_6$ are obtained as the residue.

EXAMPLE 1

About 200 g of a mixture containing cyclic dimethylpolysiloxanes having from 3 to 11 siloxane units per molecule, in which the amount of octamethylcyclotetrasiloxane predominates over the amount of other cyclic dimethylpolysiloxanes, are mixed with 3.4 g of vinyldimethylchlorosilane and 0.04 ml of a 25 percent by weight solution of phosphonitrile chloride in methylene chloride in a glass flask equipped with stirrer and distillation apparatus. The reaction mixture is heated to 90° C. and stirred slowly at this temperature for 5 hours. About 13.6 g of a mixture containing dimethylpolysiloxanes having one Si-bonded hydroxyl group in each of the terminal units and containing an average of 12.5 dimethylsiloxane units per molecule and 3.5 percent by weight of Si-bonded hydroxyl groups are subsequently added to the reaction mixture.

The reaction mixture is then stirred at 90° C. and at 20 hPa (under a water-pump vacuum) for an additional 2 hours. In order to deactivate the phosphonitrile chloride and to remove the remaining hydrogen chloride, 1.0 g of 1,3-divinyl-1,1,3,3-tetramethyldisilazane are then added to the reaction mixture. After heating the reaction mixture at 150° C. and at 1 hPa (abs.) for 2 hours in order to remove the volatile components, 192 g (88 percent of theory) of a water-clear dimethylpolysiloxane containing vinyldimethylsiloxy groups as terminal units and having a viscosity of 575 mPa.s at 25° C. are obtained. The dimethylpolysiloxane thus obtained has an iodine value (=number which indicates how many g of iodine are bound by 100 g of substance) of 3.8.

EXAMPLES 2 TO 9

The procedure described in Example 1 is repeated, except that the 3.4 g of vinyldimethylchlorosilane and the 13.6 g of the mixture of dimethylpolysiloxanes containing one Si-bonded hydroxyl group in each of the terminal units is replaced by the amounts shown in Table 1 of vinyldimethylchlorosilane and hydroxyl-terminated dimethylpolysiloxane. The yields of dimethylpolysiloxanes containing vinyldimethylsiloxy groups as terminal units, the viscosities and iodine values are given in Table 1. It can be seen from Table 1, that the viscosity of the final product can be controlled by the amount of vinyldimethylchlorosilane employed.

TABLE 1

| Examples | CH$_2$=CH(CH$_3$)$_2$SiCl g | % by wt.[1] | HO[Si(CH$_3$)$_2$O]$_{12.5}$H g | % by wt.[1] | Viscosity mPa.s at 25° C. | Yield g | % of theory | Iodine Value[2] |
|---|---|---|---|---|---|---|---|---|
| 1 | 3.4 | 1.7% | 13.6 | 6.8% | 575 | 192 | 88 | 3.8 |
| 2 | 3.0 | 1.5% | 12.0 | 6.0% | 750 | 189 | 87 | 3.58 |
| 3 | 2.5 | 1.25% | 9.7 | 4.85% | 1,000 | 180 | 83 | 3 |
| 4 | 1.2 | 0.6% | 4.86 | 2.43% | 3,960 | 176 | 81 | 1.63 |
| 5 | 1.0 | 0.5% | 3.88 | 1.94% | 7,530 | 180 | 83 | 1.47 |
| 6 | 0.8 | 0.4% | 3.2 | 1.6% | 10,350 | 178 | 82 | 1.3 |
| 7 | 0.7 | 0.35% | 2.8 | 1.4% | 20,000 | 178 | 82 | 1.05 |
| 8 | 0.6 | 0.3% | 2.4 | 1.2% | 40,500 | 189 | 87 | 0.93 |
| 9 | 0.2 | 0.1% | 0.8 | 0.4% | 430,000 | 189 | 87 | 0.3 |

[1]Based on the weight of the amount of cyclic dimethylpolysiloxane employed.
[2]Number which indicates how many g of iodine are bound by 100 g of substance.

EXAMPLES 10 TO 12

The procedure in Example 1 is repeated, except that 200 g of dimethyldichlorosilane hydrolyzate containing 30 percent by weight of cyclic dimethylpolysiloxanes having from 3 to 11 siloxane units per molecule and 70 percent by weight of a mixture of dimethylpolysiloxanediols containing from 20 to 50 siloxane units per molecule, are substituted for the 200 g of the mixture containing cyclic dimethylpolysiloxanes. In addition, the 3.4 g of vinyldimethylchlorosilane and the 13.6 g of the mixture of dimethylpolysiloxanes containing one Si-bonded hydroxyl group in each of the terminal units are replaced by the amounts specified in Table 2 of vinyldimethylchlorosilane and hydroxyl-terminated dimethylpolysiloxane. The yields of dimethylpolysiloxanes containing terminal vinyldimethylsiloxy groups, the viscosities and the iodine numbers are shown in Table 2. It can be seen from Table 2, that the viscosity of the final product can be controlled by means of the amount of vinyldimethylchlorosilane employed.

The dimethylpolysiloxanes containing terminal vinyldimethylsiloxy groups which are prepared in Examples 1 to 12 have a narrow molecular weight distribution as determined by means of HPLC (High Pressure Liquid Chromatography).

TABLE 2

| Examples | CH$_2$=CH(CH$_3$)$_2$SiCl g | % by wt.[3] | HO[Si(CH$_3$)$_2$O]$_{12.5}$H g | % by wt.[3] | Viscosity mPa.s at 25° C. | Yield g | % of theory | Iodine Value[2] |
|---|---|---|---|---|---|---|---|---|
| 10 | 2.0 | 1% | 7.8 | 3.9% | 1,276 | 182 | 84 | 2.41 |
| 11 | 1.0 | 0.5% | 3.88 | 1.94% | 8,672 | 189 | 87 | 1.3 |
| 12 | 0.6 | 0.3% | 2.4 | 1.2% | 43,500 | 184 | 85 | 0.81 |

[2]Number which indicates how many g of iodine are bound by 100 g of substance.
[3]Based on the weight of the amount of dimethyldichlorosilane hydrolyzate employed.

What is claimed is:

1. A process for preparing diorganopolysiloxanes containing terminal vinyldiorganosiloxy groups which comprises in a 1st step, reacting an organosilicon compound selected from the group consisting of a cyclic diorganopolysiloxane, a diorganodichlorosilane hydrolyzate and mixtures thereof with from 0.05 to 3 percent by weight of vinyldiorganochlorosilane, based on the weight of the organosilicon compound, in the presence of from 1 to 50 ppm by weight of phosphonitrile chloride, based on the weight of the organosilicon compound and the vinyldiorganochlorosilane employed to form a reaction mixture containing α-vinyldiorganosiloxy-ω-chlorodiorganopolysiloxane and in a 2nd step, adding to the reaction mixture obtained in the 1st step and containing the α-vinyldiorganosiloxy-ω-chlorodiorganopolysiloxane, a diorganopoly siloxane having one Si-bonded hydroxyl group in each of the terminal units in an amount of from 1 to 1.2 gram-moles of Si-bonded hydroxyl group in the diorganopolysiloxane per gram-atom of Si-bonded chlorine in the, vinyldiorganochlorosilane and in a 3rd step, adding hexaorganodisilazane to the reaction mixture of the 2nd step in order to deactivate the phosphonitrile chloride and remove hydrogen chloride from the diorganopolysiloxane containing terminal vinyldiorganosiloxy groups and removing low-boiling components which boil at 140° to 150° at 0.5 to 8 hPa by distillation.

2. The process of claim 1, wherein the cyclic diorganopolysiloxane has the formula $(R_2SiO)_n$ where R is selected from the group consisting of hydrocarbon radicals having from 1 to 18 carbon atoms per radical, and halogenated hydrocarbon radicals having from 1 to 18 carbon atoms per radical, and n is an integer having a value of from 3 to 11.

3. The process of claim 1, wherein the diorganodichlorosilane hydrolyzate employed is one which comprises from 20 to 30 percent by weight of a cyclic diorganopolysiloxane of the formula $(R_2SiO)_n$ and 70 to 80 percent by weight of a diorganopolysiloxane of the formula $HO(R_2SiO)_mSiR_2OH,$ based on the weight of the diorganodichlorosilane hydrolyzate employed, in which R is selected from the group consisting of hydrocarbon radicals having from 1 to 18 carbon atoms per radical and halogenated hydrocarbon radicals having from 1 to 18 carbon atoms per radical, n is an integer having a value of from 3 to 11 and m is an integer having a value of from 20 to 50.

4. The process of claim 1, wherein the vinyldiorganochlorosilane is vinyldimethylchorosilane.

5. The process of claim 1, wherein the diorganopolysiloxane containing one Si-bonded hydroxyl group in each of the terminal units has the formula $HO(R_2SiO)_pSiR_2OH$ where R is selected from the group consisting of hydrocarbon radicals having from 1 to 18 carbon atoms per radical and halogenated hydrocarbon radicals having from 1 to 18 carbon atoms per radical, and p is an integer having a value of from 8 to 13.

* * * * *